United States Patent [19]
Foster

[11] 3,808,655
[45] May 7, 1974

[54] TOOL HOLDER ASSEMBLY
[75] Inventor: Robert L. Foster, Walton, Ind.
[73] Assignee: Meredith W. Slusher, Walton, Ind.; a part interest
[22] Filed: Mar. 28, 1972
[21] Appl. No.: 238,841

[52] U.S. Cl. ............................................... 29/96
[51] Int. Cl. ............................................. B26d 1/02
[58] Field of Search ........................ 29/96; 82/36 B

[56] References Cited
UNITED STATES PATENTS
2,034,453   3/1936   Wiener ................................. 29/96
3,566,723   3/1971   Oborne ................................. 82/36
FOREIGN PATENTS OR APPLICATIONS
1,208,907   2/1960   France ................................. 29/96

Primary Examiner—Andrew R. Juhasz
Assistant Examiner—W. R. Briggs
Attorney, Agent, or Firm—Gust, Irish, Lundy & Welch

[57] ABSTRACT

In a tool holder assembly, the combination comprising a forming tool and a support member having complementary interlocking surfaces and clamping means for maintaining the tool and the member in interlocking relationship. The clamping means is operable between a first position in which it positively locks the tool to the support and a second position in which it permits relative sliding movement and limited separation therebetween. A first elongated recess is provided in the support member and a cylindrical threaded element is rotatably received therein. A second recess is formed in the tool in registry with the first recess, the second recess having a threaded wall which is operatively engaged with the threaded element when the clamping means is between its first and second positions and which is slidably engaged therewith when the clamping means is in its second position.

8 Claims, 2 Drawing Figures

PATENTED MAY 7 1974                                    3,808,655

TOOL HOLDER ASSEMBLY

BACKGROUND OF THE INVENTION

1. Field of the Invention

The present invention relates to holders for forming tools and in particular to a tool supporting assembly which permits different forming tools to be slidably interchanged with the tool holder, precisely positioned by means of a threaded element, and positively clamped in position for use.

2. Description of the Prior Art

One of the basic elements of a conventional engine lathe, screw machine, or the like is the tool holder which serves to properly position and support the cutting or forming tools with respect to the work piece. When such a machine is being used, it is also well known that different forming tools must be used for different cutting operations, thereby necessitating that the forming tools be periodically and, sometimes frequently, interchanged. This need for interchangeability has resulted in wide use of so-called "dovetail" tool supports which incorporate an interlocking dovetail joint and a clamping device whereby the forming tool can be slidably fitted to the tool holder and clamped in position. However, this type of joint, while it provides for greater ease in changing the forming tools, requires a significant amount of skill to properly and precisely position the forming tool with respect to the work piece. Correspondingly, various mechanisms have been developed for adjustably securing the forming tool to the tool holder. Typically, these adjusting mechanisms incorporate one or more threaded couplings in the tool holder. While these adjustable tool holders have aided in providing the necessary close adjustment of the forming tool position, they have proved to be relatively complex assemblies having a plurality of close tolerance, relatively movable parts. Further, adjusting mechanisms frequently interfere with the removal of the forming tools thereby again increasing the time required to interchange forming tools for different cutting operations.

SUMMARY OF THE INVENTION

The present invention overcomes these difficulties and comprises broadly in combination a forming tool and a support member having complementary interlocking surfaces and clamping means for maintaining the tool and the supporting member in interlocking relationship. The clamping means is operable between a first position in which it positively clampingly locks the forming tool to the support member and a second position in which the clamping means permits relative sliding movement between the forming tool and the supporting member in a predetermined direction and limited separation therebetween in another direction normal to the first direction. A first elongated recess having a shoulder adjacent one end thereof is formed in the supporting member and a threaded element is rotatably received therein. A second recess is formed in the forming tool in registry with the first recess, the wall of the second recess being threaded and operatively engaging the aforementioned threaded element when the clamping means is between its first and second positions and which slidably engages the threaded element when the clamping means is in its said second position. When the clamping means is in said first position, the threaded element abuttingly engages the aforementioned shoulder such that the cutting forces applied thereagainst are supported thereby.

The forming tools can be quickly and easily slidably removed from the tool holder when the clamping means is in the aforementioned second position. Conversely, a different forming tool can be slidably inserted into the tool holder when the clamping means is in its second position and precisely positioned by means of the threaded element. Once the forming tool has been thus positioned, the clamping means is moved into its first position thereby locking the forming tool and placing it in condition for use.

It is therefore an object of the present invention to provide an improved tool holder assembly which provides for ease in changing the forming tool therein.

It is another object of the invention to provide a tool holder assembly which positively mechanically locks a forming tool in position for use.

It is yet another object of the invention to provide such a tool holder assembly which includes means for precisely and easily positioning the forming tool in position for use.

It is still another object of the invention to provide a forming tool which is rugged, utilizes a minimum of components, and adapted for use with conventional forming tools.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
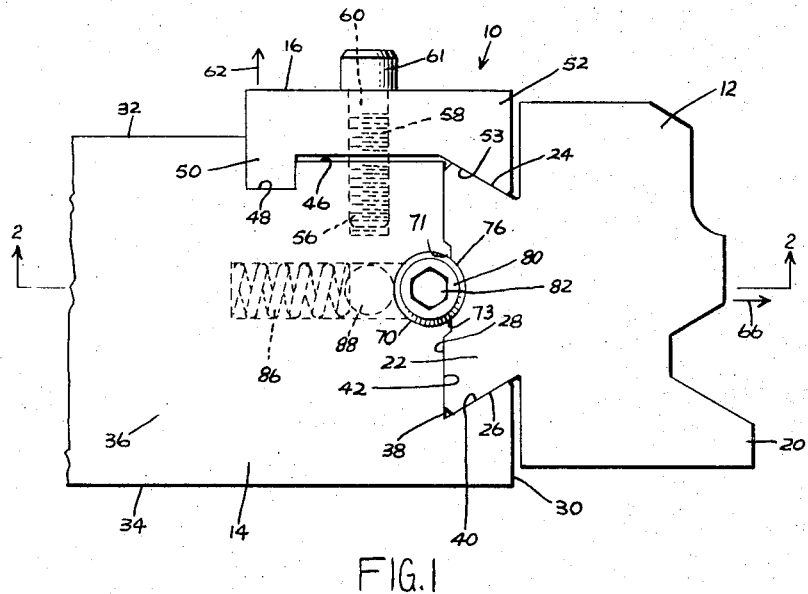
FIG. 1 is a top plan view of the tool holder assembly of the present invention with portions of the internal mechanisms thereof shown in phantom.
Figure 2:
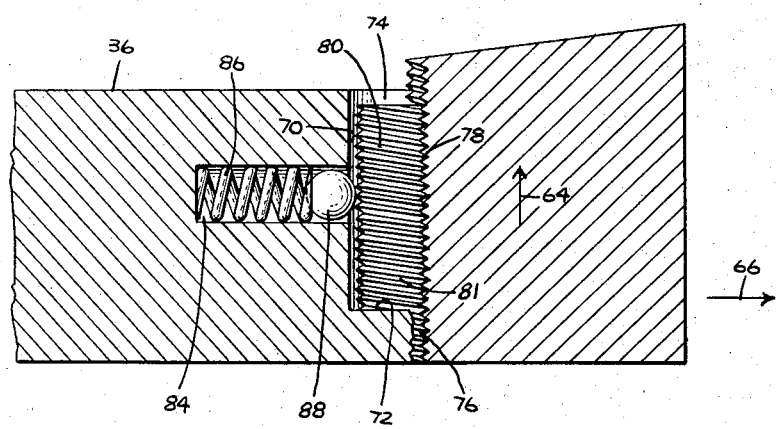
FIG. 2 is a sectional view of the tool holder assembly taken generally along line 2—2 of FIG. 1.

Referring now to the drawings there is illustrated a tool holder assembly indicated generally at 10 which comprises a forming tool 12, a support member 14, and a clamping plate 16.

Forming tool 12 has a cutting face 20 and is provided with a dovetail joint portion 22 having interlocking side surfaces 24, 26 and a face surface 28. To this extent, forming tool 12 is conventional and familiar to those skilled in the art.

Supporting member 14 is fixedly connected to a lathe, screw machine, or the like (not shown) and is formed from a generally rectangular block of steel and has an end surface 30, side surfaces 32, 34 and a top surface 36. End surface 30 has a portion of a female dovetail recess 38 cut thereinto. That is, recess 38 has a side surface 40 complementary to side surface 26 and a face surface 42 complementary to face surface 28, but has an open side adjacent side surface 24 of male dovetail portion 22. Male dovetail portion 22 is slidably received in recess 38 as shown with side surfaces 26 and 40 of forming tool 12 and support member 14, respectively, in slidable interlocking relationship.

Side 32 of support member 14 has formed therein a rectangular recess 46 which intersects face surface 42 as shown. A slot 48, also of rectangular cross section, is formed in member 14 adjacent the left (as viewed in FIG. 1) of recess 46 and communicates therewith.

Clamping plate 16 is provided with a boss portion 50 complementary to slot 48 and is positioned with boss portion 50 in sliding engagement with slot 48. End 52 of clamping member 16 distal boss portion 50 is flared and extends outwardly with respect to face surface 42 of recess 38 such that it serves as the second side 53 of recess 38 thereby completing same. Correspondingly, it will be observed that clamping member 16 functions to maintain forming tool 12 in interlocking engagement with support member 14.

To provide a means for securing clamping plate 16 to support member 14, there is provided a threaded hole 56 in support member 14 and a clearance hole 58 through clamping member 16 in registry therewith. A threaded fastener 60 having an enlarged head 61 passes through clamp hole 58 and threadingly engages hole 56.

It will now be apparent that when threaded fastener 60 is tightened, it will force clamping member 16 into firm, clamping engagement with boss portion 22 of tool 12 thereby clamping same in position. Conversely, when threaded fastener 60 is loosened, it will permit clamping member 16 to move laterally outwardly with respect to support member 14 as indicated by arrow 62. As clamping member 16 thus moves outwardly there will be provided a clearance between male dovetail side surface 24 and clamping plate surface 53. It will be apparent that this clearance will permit forming tool 12 to slide with respect to support member 14 as indicated by arrow 64. Further, this clearance will permit forming tool 12 to move outwardly in a direction normal to face surface 42 as indicated by arrow 66, this movement being for a purpose to be explained below.

A first arcuate recess 70 is formed in support member 14, arcuate recess 70 communicating with face surface 42 and extending longitudinally parallel thereto. Arcuate recess 70 has a closed end 72 and an open end 74 and has an arc greater than 180° and preferably defines an arc of about two-thirds of a full circle.

A second arcuate recess 76 is formed in facing surface 28 in registry with arcuate recess 70, arcuate recess 76 extending the full length of facing surface 28 and having a threaded wall 78. It will be observed that arcuate recess 76 extends through an arc less than 180° and has preferably about one-third of the arc of a complete circle. It will further be observed that arcuate recess 70 and arcuate recess 76 together define a complete circular hole.

An elongated threaded element 80 having a hexagonal socket 82 in the end thereof is rotatably received in arcuate recess 70 and threadedly engages threaded wall 78. It will be apparent that the terminal edges 71 and 73 of recess 70 function as flanges which prevent element 80 from falling out of recess 70 when tool 12 is not present.

A cylindrical hole 84 is formed in support member 14, hole 84 extending generally normal to face surface 42 and communicating therewith as shown. The compression spring 86 and a spherical ball 88 are slidably received within hole 84 whereby ball 88 abuttingly engages threaded element 80 and is maintained in a resilient engagement therewith by spring 86.

In use, forming tool 12 has its dovetail portion 22 interlockingly engaged with the dovetail recess 38 defined by side surface 40 and face surface 42 of support member 14 and surface 53 of clamping member 16. Threaded fastener 60 is securely tightened against clamping member 16 thereby securely clamping forming tool 20 in position. Threaded element 80 is threadingly engaged with the threaded wall 78 of arcuate recess 76, and the lower end 81 of threaded element 80 also abuttingly engages closed end 72 of arcuate recess 70. Correspondingly, forces exerted against forming tool 12 during machining operations are transmitted to and counteracted by closed end 72 via threaded element 80. It is thus apparent that when a tool holder assembly is set up for use, it provides a positive and rigid support for the forming tool 12.

When it is desired to replace the forming tool with a similar forming tool adapted to perform a different cutting function, threaded fastener 60 is first loosened thereby permitting clamping element 16 to move laterally outwardly from support member 14 as indicated by arrow 62. This, as explained above, provides a clearance between dovetail portion 22 and dovetail recess 38. When threaded fastener 60 has been loosened a sufficient amount, it will now be apparent that forming tool 12 can be moved normally outwardly from supporting member 14 as indicated by arrow 66 by an amount sufficient to permit the threads of threaded element 80 and the threads of threaded wall 78 to be forcibly slid or slipped relative to each other. It can now be seen that the forming tool 12 can be simply and easily slid out of engagement with support member 14. Preferably, threaded element 80 is maintained in a position within arcuate recess 70 by placing a finger over the top of arcuate recess 70 thereby trapping the threaded element 80 therein. As an alternative to the operator using his finger to retain the threaded element 80 within arcuate recess 70, a retaining element such as a pin or a threaded fastener having an enlarged head may be secured to the upper surface 36 of support member 14 with the pin or a portion of the enlarged head of a threaded fastener extending over and partially closing the opening 74 of arcuate recess 70. It should be observed that when such a retaining element is used, it must be proportioned such that it does not interfere with or block entry of a tool into the hexagonal socket 82 of threaded element 80.

Now a second forming tool 12 which also has a dovetail portion 22 and threaded arcuate recess 76 can be slidably inserted into dovetail recess 38 in interlocking engagement with support member 14. Again, when the new forming tool is inserted, the threads 78 of arcuate recess 76 will be permitted to slip over the threads of threaded element 80 by reason of the clearances between dovetail recess 38 and dovetail portion 22. When the forming tool 12 is in an approximate operating position, final adjustment to the position of forming tool 12 can be effected by inserting a suitable tool into the socket 82, it being apparent that rotation of threaded element 80 will effect a precisely controllable movement to forming tool 12. When forming tool 12 has been precisely positioned, threaded fastener 60 is again tightened thereby clamping forming tool 12 in position and preventing further slippage or movement of forming tool 12 with respect to support member 14.

It will also be observed that precise positioning of forming tool 12 can be effected when threaded fastener 60 is in its loosened or second position since spring 86 and ball 88 will maintain the threaded element 80 in positive engagement with the threads of the forming tool recess 76. It is of course obvious that threaded element 80 will not provide a positive mechanical stop to resist movement of forming tool 12 upwardly (as viewed in the drawings) with respect to support member 14. However, since the forming tool will not be subjected to any upwardly directed forces during use, it is apparent that no mechanical stop to resist upward movement of the forming tool is required.

It will also be apparent to those skilled in the art, that overtightening of the forming tool into the tool support member 14 is obviated since the only forces therebetween are the clamping force exerted by clamping member 16 and the interlocking relationship of the threads of the threaded element 80 and recess 76. The tool holder assembly of the present invention thereby further eliminates the possibility of overtightening a set screw against the forming tool and thereby the possibility of undue stress being exerted thereagainst which stress may result in failure of the tool.

From the above description, it will be apparent that the changing of the forming tools 12 with the tool holder assembly 10 of the present invention can be effected very quickly and easily. The forming tools can further be precisely positioned relative to the work piece. The complete interchange can be effected quickly since it is only necessary to loosen threaded fastener 60 to permit the forming tool 12 to be slidably removed from engagement with support member 14. A similar limited amount of manipulation is required to insert, position, and lock a different forming tool in operating position.

While there have been described above the principles of this invention in connection with specific apparatus, it is to be clearly understood that this description is made only by way of example and not as a limitation to the scope of the invention.

What is claimed is:

1. In a tool holder assembly, the combination comprising a forming tool and a support member having complementary interlocking surfaces, clamping means for maintaining said tool and said member in interlocking relationship, said clamping means being operable between a first position in which said clamping means positively locks said tool to said support and a second position in which said clamping means permits relative sliding movement between said tool and said member in a first predetermined direction and limited separation between predetermined ones of said complementary surfaces, a first recess in said member having a shoulder adjacent one end thereof, a cylindrical threaded element rotatably received in said recess and abuttingly engaging said shoulder, a second recess in said tool disposed in registry with said first recess and having a threaded wall operatively engaging said threaded element when said clamping means is between said first and said second positions and slidably engaged therewith when said clamping means is in said second position, means for retaining said threaded element in said first recess, said retaining means including a pair of flanges extending longitudinally with respect to said first recess adjacent the terminal edges thereof, a hole in said member extending transversely to the axis of said threaded element and opening through said first recess, spring means slidably received in said hole for resiliently engaging said threaded element and urging the same normally outwardly with respect to said first recess toward engagement with said flanges.

2. The combination of claim 1 wherein said first and second recesses are arcuate in cross-section, the combined cross-sections of said first and second recesses defining a circle, the arc of said first arcuate recess being greater than the arc of said second arcuate recess, the terminal edges of said first arcuate recess defining said flanges.

3. The combination of claim 1 wherein said interlocking surfaces of said tool have a male dovetail configuration having an end surface and side surfaces, the interlocking surfaces of said member including a face surface and one side surface complementary to said face surface and one of said side surfaces of said tool, the interlocking surface of said clamping means being complementary to the other of said side surfaces of said tool.

4. The combination of claim 3 wherein said clamping means includes a slot in said member extending parallel to said first recess, said recess being elongated, a rigid plate having a boss thereon having a cross-section complementary to said slot and slidably received therein, a threaded hole in said member, a clearance hole in said plate disposed in registry with said threaded hole, and a threaded fastener received through said clearance hole and threadingly engaging said threaded hole.

5. The combination of claim 4 wherein said slot is in a side of said member disposed in a plane parallel to the longitudinal dimension of said first recess and perpendicular to said face surface of said member.

6. The combination of claim 1 wherein said spring means includes a helical compression spring and a slide element, said slide element slidably engaging said threaded element and abuttingly engaging said spring.

7. The combination of claim 6 wherein said hole is provided with a bottom against which said spring bears at one end, the other end of said spring engaging said slide element, said hole having a sliding fit with said spring thereby to retain said spring in position.

8. The combination of claim 7 in which said slide element is ball shaped and said hole extends perpendicular to the axis of said threaded element.

* * * * *